D. HORRIE.
Railroad Ditching-Machine.

No. 205,270. Patented June 25, 1878.

WITNESSES:
Chas. Nida.
C. Sedgwick

INVENTOR:
D. Horrie
BY Munn & Co.
ATTORNEYS.

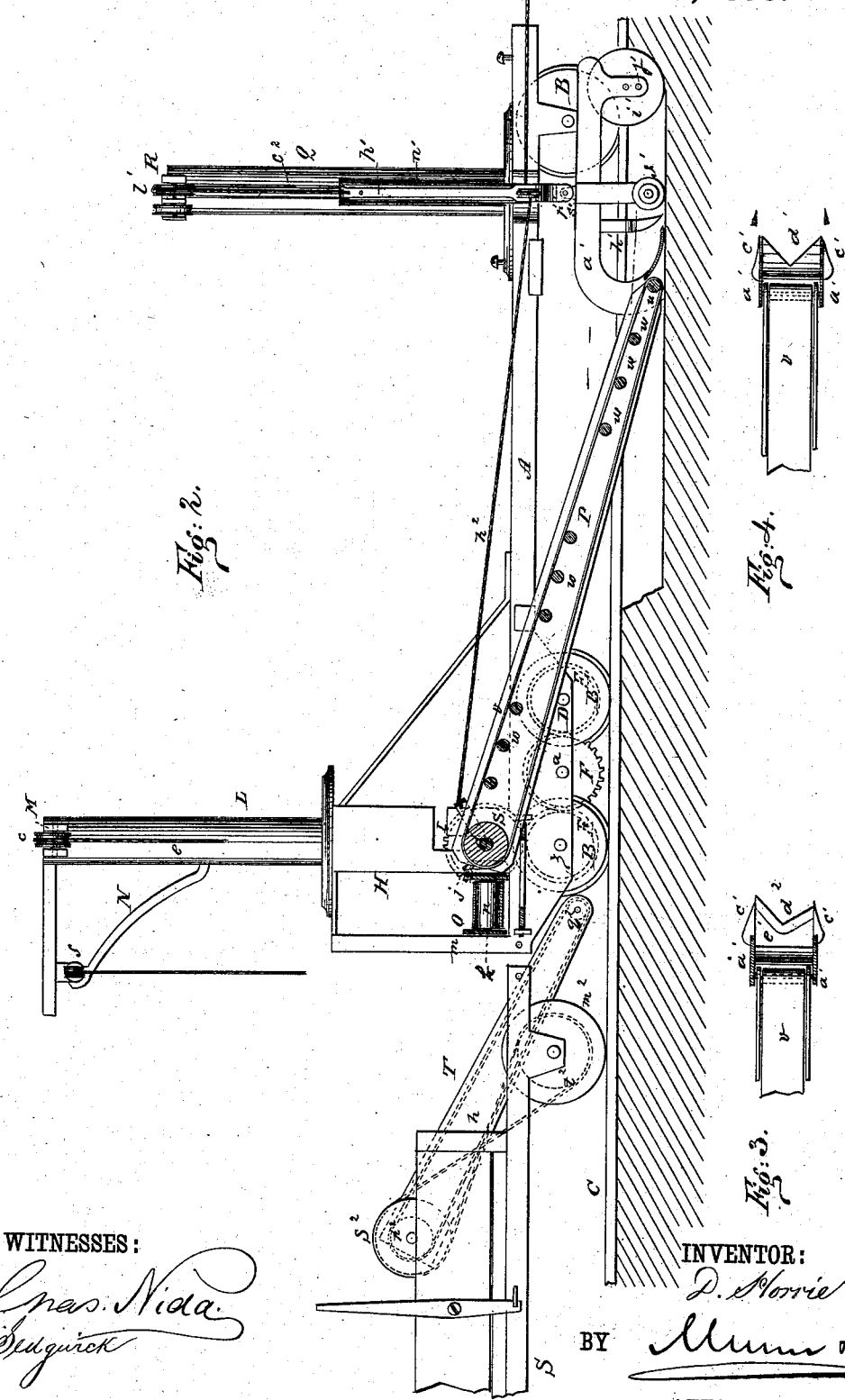

D. HORRIE.
Railroad Ditching-Machine.

No. 205,270. Patented June 25, 1878.

UNITED STATES PATENT OFFICE.

DAVID HORRIE, OF KEOKUK, IOWA.

IMPROVEMENT IN RAILROAD-DITCHING MACHINES.

Specification forming part of Letters Patent No. 205,270, dated June 25, 1878; application filed February 2, 1878.

*To all whom it may concern:*

Figure 1:
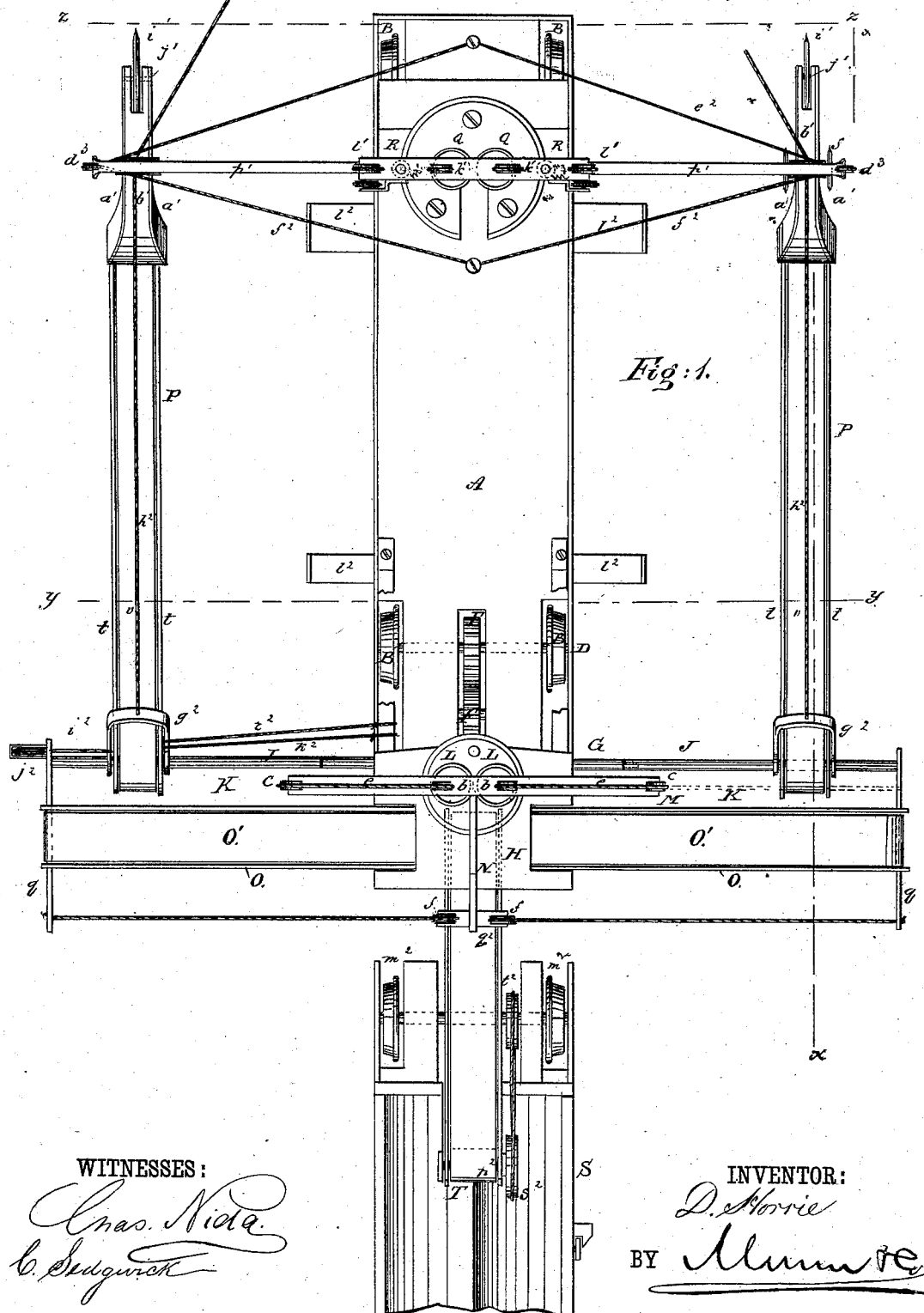
Figure 5:
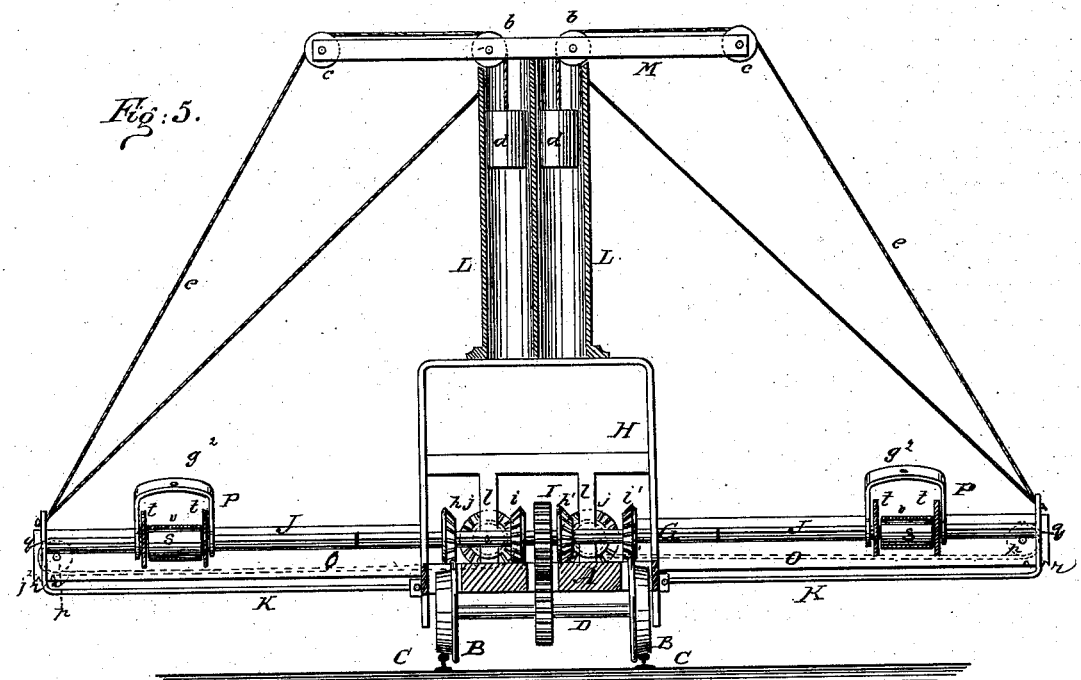
Figure 6:
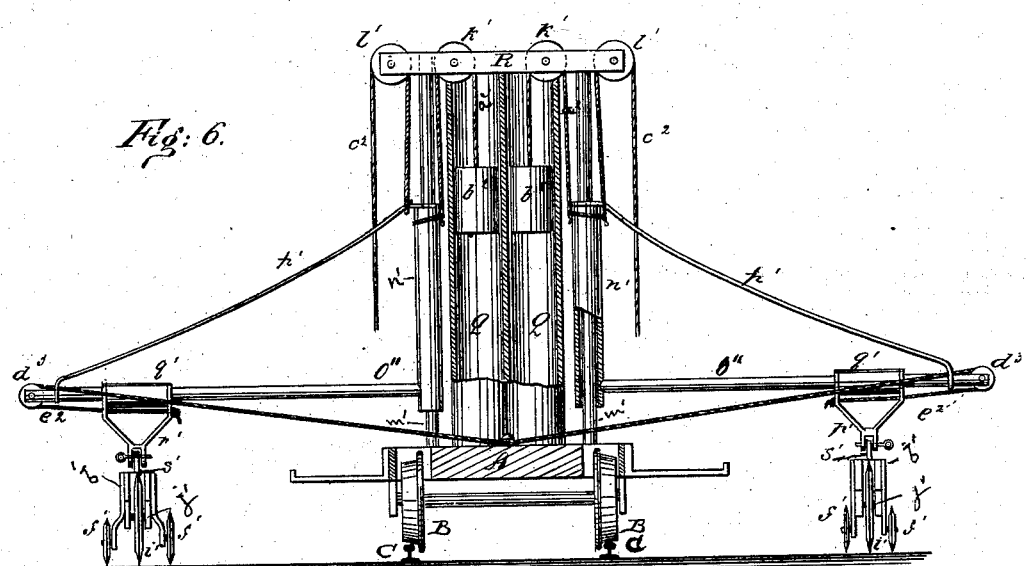

Be it known that I, DAVID HORRIE, of Keokuk, in the county of Lee and State of Iowa, have invented a new and Improved Railroad-Ditching Machine, of which the following is a specification:

Figure 1 is a plan view of my improved ditching-machine. Fig. 2 is a side elevation taken in section on line $x$ $x$ in Fig. 1. Figs. 3 and 4 are horizontal sections through the shares of the plows. Fig. 5 is a vertical transverse section taken on line $y$ $y$ in Fig. 1, with the hollow columns L L in sections. Fig. 6 is a vertical transverse section taken on line $z$ $z$ in Fig. 1, with the hollow columns Q Q partly in section.

Similar letters of reference indicate corresponding parts.

The object of the invention is to provide a machine which may be drawn forward on the railway-track by the locomotive, and will rapidly form ditches at the sides of the track and deliver the earth at the sides of the track, or at the center of the track, or to a car, by which it may be carried away.

Referring to the drawing, A is the platform of a car, which is mounted on wheels B, that are adapted to the track C, and which carries the plows and earth elevating and conveying machinery. The rear end of the platform A is supported by four car-wheels, B, two upon each axle D, and upon each axle D a spur-wheel, E, is secured. An intermediate spur-wheel, F, is placed between the two spur-wheels E on the shaft $a$, and communicates the power of the forward axle to the rear axle.

If desired, the wheels of the two axles may also be connected by parallel rods.

A shaft, G, is journaled in the frame H, that is supported by the rear end of the platform, and the said shaft is provided with a spur-wheel, I, that meshes into the spur-wheel E on the rear axle D. An extension-piece, J, is screwed into each end of the shaft G. The outer ends of the extension-pieces J are supported by frames K, which are hinged to the sides of the frames H. Upon the frame H two hollow columns, L, are mounted, which support the beam M, and also the bracket N. In the beam M there are two sheaves, $b$, one over each column, and two sheaves, $c$, one in each end of the beam.

Each supporting-frame K is counterbalanced by a weight, $d$, in one of the hollow columns, which is connected with a rope, $e$, that passes over the sheaves $b$ $c$ and is attached to the outer end of the frame. The bracket N supports two sheaves, $f$, over which the frame-elevating ropes pass.

Upon the shaft G four bevel-wheels, $h$ $h^1$ and $i$ $i^1$, are secured, two on each side of the spur-wheel I. Between each pair of bevel-wheels a bevel-pinion, $j$, is supported by a shaft, $k$, which is journaled in a swinging frame, O, and projects through slots in the bars $l$ $m$ of the frame H. Between the side pieces of each frame O a roller, $n$, is placed on the shaft $k$, for receiving the conveyer-belt $o'$, whose outer end runs over a roller, $p$, journaled in the free end of the frame O. The free end of the frame O rests in a notch in the end piece $q$ of the swinging frame K, and its sides are provided with two notches, $r$ $r$, for receiving the edge of the end piece $q$.

The bevel-pinions $j$ are thrown into gear with either of the driving-wheels by sliding the frames O. The said frames are kept in either of their positions by the engagement of the notches $r$ with the edge of the end piece $q$. Upon each end of the shaft G a drum, $s$, is placed, which is capable of sliding longitudinally on the shaft and the extension thereof, but is prevented from turning thereon by a slot in the shaft and a spline in the drum. At each side of the drum $s$ the side pieces $t$ of the swinging frame P are pivoted on the shaft G. The frames P extend forward parallel with the sides of the platform A, and in the free end of each frame a drum, $u$, is journaled, over which and over the drum $s$ an endless apron, $v$, passes. A number of rollers, $w$, are journaled in the frame P for supporting the endless apron $v$.

To the forward end of the frame P two plow-beams, $a^1$ $a^1$, are pivoted, one at each side of the frame. These beams are connected together by a web, $b^1$, and are each provided with a share, $c^1$. The shares are connected by a curved V-shaped scraper or cutter, $d^1$, as represented in Fig. 4, that delivers the earth to the endless apron $v$; or they may be connected by a V-shaped cutter, $d^2$, and a scraper, $e^1$, as represented in Fig. 3.

Rotary cutters $f^1$ are supported by standards that project downward from the beams $a^1$. The plows may also be provided with ordinary colters $h^1$.

A rotary cutter, $i^1$, of large diameter, is journaled in supports $j^1$, that project downward from the forward end of the beams $a^1$. At the forward end of the platform A there are two hollow columns, Q, which support the cross-bar R, in which there are sheaves $k^1$, located over the columns. There are sheaves $l^1$ in the ends of the cross-bar R, for receiving the ropes for raising the plows. Between the sheaves $l^1$ and the standards there are round bars $m^1$, that are attached to the cross-bar R, and extend downward parallel with the columns Q. Upon each bar $m^1$ a sleeve, $n'$, is placed, from the lower end of which a horizontal arm, $o''$, projects, which is supported by a brace, $p^1$, attached to its outer end, and also to the upper end of the sleeve $n'$. On the arm $o''$ there is a sleeve, $q^1$, which is provided with a hanger, $r'$, that is jointed to an ear, $s^1$, that projects from the web $b^1$, that connects the plow-beams $a^1$.

Ropes $a^2$ are attached to the upper ends of the sleeves $n'$, and run over the sheaves $k^1$, and are attached to the weights $b^2$ in the columns Q. These weights counterbalance the sleeves $n'$ and the parts connected with them, so that little force is required to move them up or down.

Lifting-ropes $c^2$ are attached to the upper end of the sleeves $n'$, and run over the sheave $l^1$, and downward toward the platform A, where they may be readily operated.

In the outer end of each horizontal bar $o''$ there is a sheave, $d^3$, over which a rope, $e^2$, passes, which is secured to the sleeve $q^1$.

By means of the rope the sleeve and the plow suspended from it may be drawn toward the outer end of the bar $o''$. A rope, $f^2$, is attached to the sleeve $q^1$, for drawing the plow inwardly.

A yoke, $g^2$, is attached to the frame P, and to it is fastened a rope, $h^2$, which runs forward, and is attached to the sleeve $q^1$. A rope, $i^2$, is attached to the yoke $g^2$, and runs over a sheave, $j^2$, at the outer end of the frame K, and inward to the platform A. A rope, $k^2$, is also secured to the yoke $g^2$, and runs inwardly to the platform A.

By means of the rope $i^2$ the rear end of the frame P is drawn toward the outer end of the frame K. By means of the rope $k^2$ it may be drawn toward the platform A.

The plows, conveyers, and other parts are of the same construction on both sides of the platform, and the plows and conveyers may be moved outwardly any required distance within the range of the machine, so that the ditches may be formed at any distance from the side of the track.

Brackets $l^2$ project from the sides of the platform A, for supporting the side conveyers when not in use.

A dumping-car, S, is coupled with the platform A, when it is desired to load the earth removed by the ditching. This dumping-car, which may be of any of the well-known forms, is carried upon wheels $m^2$, and is provided with an inclined conveyer, T, which consists of a frame, which is pivoted at its upper end between standards that project from the platform of the car, and in the said frame there are two drums, $p^2$ $q^2$, which support an endless apron.

To the shaft of the upper drum $p^2$ a sheave, $s^2$, is secured, which is driven by a belt or chain from a sheave, $t^2$, on the axle of the forward wheels $m^2$.

The frame is capable of swinging on the shaft of the drum, so that it can be thrown over on the car or be placed in an inclined position, with its lower end below the inner ends of the aprons in position to receive the earth from them.

The car S is coupled to the platform A, and receives the earth which is removed in forming the ditches.

The operation of my improved machine is as follows: The plows are moved outward from the side of the platform A, as far as may be desirable, when they are lowered, so as to cut into the earth, forming a ditch of the depth required. The endless apron $v$ is rotated by the shaft G, so that the earth removed by the plows and delivered to the said aprons will be carried upward and delivered to the aprons, which convey the earth outwardly and deliver it beyond the ditches, or convey it to the center of the machine and deliver it to the conveyer T, which carries it upward and deposits it in the car S.

By folding the conveyer T on the car S the earth may be deposited on the track between the rails. The apparatus is drawn forward by a locomotive, and will rapidly form ditches of a uniform level and parallel with the track.

When the machine is moved from place to place the frames P are placed on the brackets $l^2$, the plows are disengaged from the hangers $r^1$, and the horizontal bars $o''$ are swung around parallel with the edges of the platform A. The extension-pieces J are then unscrewed, and the frames O K are together folded up against the frame H. The machine is then put into compact form for transportation.

Having thus described my invention, I claim as new and desire to secure by Letters Patent—

1. The combination, with the car-truck and elevating mechanism, of the beam $a^1$, connected by a web, $b^1$, and provided with shares $c^1$, a V-shaped scraper, $d^1$, and rolling cutters $f^1$ $i^1$, the webs $b^1$ being jointed to a frame, $q^1$ $r^1$, as shown and described.

2. In a ditcher, the combination, with the driving-wheels and pinions $j$, of the frame K and sliding frame O, the former having notched end piece $q$, as and for the purpose set forth.

3. The combination of bars $m^1$, sleeves $n^1$, arms $o''$, and brace $p^1$, to support the sleeve $q^1$, as specified.

4. The ditching device jointed to a sleeve adjustable on an arm, $o''$, as and for the purpose described.

5. The combination, in a ditcher, of a platform, A, frames P K, and ropes $i^2 k^2$, as and for the purpose specified.

6. The hinged frame K, in combination with the frame H, for supporting the swinging frames O P, and the shaft-extension J, substantially as specified.

7. The hollow columns L and the counterbalance-weights $d$, in combination with the hinged frame K, substantially as herein shown and described.

8. The combination of the dumping-car S, carrying an inclined conveyer-apron, with the aprons $o$ of the ditching-machine, substantially as shown and described.

DAVID HORRIE.

Witnesses:
WM. L. REITER,
C. S. DETWILER.